United States Patent [19]
Ryan

[11] Patent Number: 5,188,368
[45] Date of Patent: Feb. 23, 1993

[54] ELECTRONIC GAME APPARATUS

[75] Inventor: Paul T. Ryan, Cambridgeshire, Great Britain

[73] Assignee: Saitek Limited, Kowloon, Hong Kong

[21] Appl. No.: 691,028

[22] PCT Filed: Oct. 25, 1990

[86] PCT No.: PCT/GB90/01641

§ 371 Date: Jun. 25, 1991

§ 102(e) Date: Jun. 25, 1991

[87] PCT Pub. No.: WO91/06352

PCT Pub. Date: May 16, 1991

[30] Foreign Application Priority Data

Oct. 25, 1989 [EP] European Pat. Off. ........ 89311024.7

[51] Int. Cl.⁵ ............................................. A63F 3/02
[52] U.S. Cl. ................................ 273/237; 340/323 R
[58] Field of Search ........................... 273/237, 238; 340/323 R

[56] References Cited

U.S. PATENT DOCUMENTS 3,760,404 9/1973 Khlebutin ............... 273/136 A X
4,981,300 1/1991 Winkler ...................... 273/238
5,082,286 1/1992 Ryan et al. ................... 273/238

FOREIGN PATENT DOCUMENTS 2295699 12/1988 European Pat. Off. .
2103943 3/1983 United Kingdom .

Primary Examiner—William H. Grieb
Attorney, Agent, or Firm—Townsend and Townsend

[57] ABSTRACT

An electronic game apparatus for determining the presence and optionally the identity of playing pieces. Each playing piece (10) is provided with a resonator circuit (12,14,16), which may be tuned so that each playing piece or type or piece has a unique resonant frequency. A board (2) defining a number of particular playing positions is provided with transmit and receive coils (4,6) underneath it to stimulate the resonator circuit of a piece and to sense the resonant signal respectively. An amplifier is provided between the two sets of coils to amplify the signal generated by the resonant circuit. A resonant signal results if a playing piece is placed on a particular position on the board (2). The frequency of this signal is detected and may then be determined and the piece thereby identified.

10 Claims, 4 Drawing Sheets

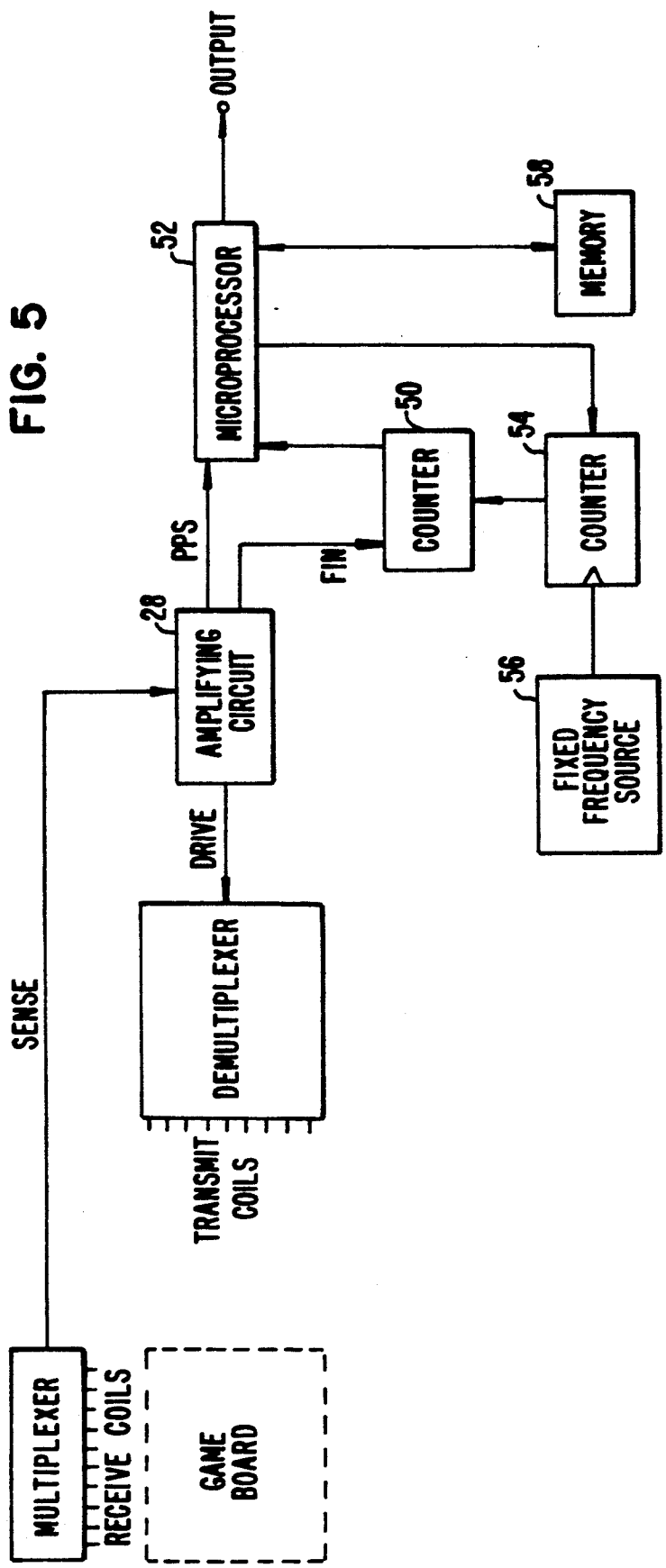

ELECTRONIC GAME APPARATUS

This invention relates to electronic game apparatus and in particular to such a game where the role of one of the players is taken over by a computer. The invention can typically be applied to board games such as chess in which different pieces or ranks of pieces are to be located.

Various board games of this type are already known. One such game consists of a board which can sense the presence of a playing piece on the board. This may be done by means of a switch, such as a reed switch, located beneath each playing square. A magnet is provided within the playing pieces and, as a playing piece is placed on the square, the magnet causes the switch to flip. Electronics are provided to detect this switch action and so determine that a piece has been placed on or removed from the playing square.

Another presence sensing system is described in our British Patent Application No. 8920204. In this system, two sets of coils are placed beneath the playing surface, one set to transmit a signal and one set to receive a signal. A metal disc is provided in the base of each playing piece. An alternating current signal is then sent down each transmit coil in turn and mutually couples with the receive coils. If a playing piece is present on a square, the voltage induced in the receive coil below that square will be significantly reduced, owing to the presence of the metal disc. Electronics are provided to detect the induced voltage, compare it with a reference and hence determine whether or not a piece is present on each square.

Board games which merely detect the presence of a playing piece have the disadvantage that the board cannot directly recognise the rank of, for example, a particular chess piece on a square. This difficulty can be overcome by identifying a piece relative to the position it took at the start of the game. Thus, the game has to start with the playing pieces in pre-defined positions. The position from and to which a piece is moved (which is detected by the presence sensing system) then allows the identity of the piece to be determined. It is not therefore possible for a player to set up a practice game, as if play was in progress, without entering the position and rank of the playing pieces into the memory.

Board game apparatus has been developed which can directly identify the rank of particular playing pieces. One such apparatus is disclosed in British Patent No. 2 103 943 wherein tuned circuits (resonators) are fitted to each of the pieces. These tuned circuits consist of coils which are wound on rod cores and are connected to capacitors. The coils within the playing pieces couple with coils built into the board, which stimulate the resonators and pick up the signals produced. Different pieces or different piece types have different resonant frequencies, so that the frequency of the signal picked up in a given square indicates the piece type present on that square.

The coils in the board are arranged in two groups, one group for stimulating (or transmitting) and the other for receiving. The coils of each group are connected together in an addressable fashion using a diode at each coil. For each of the board squares, a current pulse is applied to the stimulating (or transmitting) coil, the rapid change of current on the trailing edge of this pulse making the resonator 'ring' at its resonant frequency. This signal is picked up by the sensing coil, amplified, and its frequency measured by thresholding, to give a digital signal whose transitions in a fixed period are counted. In the absence of a piece, there is no ringing so few transitions occur.

In the apparatus of British Patent No. 2 103 943, only one transition of current in the stimulating coil is used to cause the resonator to ring. This means that, in order to achieve a received signal of an appreciable amplitude, the coils within the board have to consist of several turns and a large current pulse with a fast edge has to be used. This large current pulse means that the energy consumed by this system is relatively high. Also the radiated fields are large and the sensing range is small. This system is expensive to manufacture since each coil is designed to have a diode connected thereto.

The present invention is directed towards apparatus of the kind described in British Patent No. 2 103 943 and seeks to improve on the simplicity and energy efficiency of the system.

Apparatus of the present invention comprises playing pieces each of which is provided with an electrical resonant circuit. A plurality of transmit and receive coils are provided beneath the playing surface and an amplifying circuit is provided between the transmit and receive coils to amplify the signal around the loop consisting of a selected transmit coil, a selected receive coil and the tuned circuit of a playing piece, if present. A resonant signal is therefore obtained if a playing piece is positioned on a particular discrete board position. Electronic means are provided to detect this resonance and hence the presence of a playing piece.

The system operates as a feedback oscillator which is initially triggered into oscillation by the inherent noise of the system.

This apparatus is suitable for use as a nondiscriminating system. However, it can readily be adapted to identify the piece or piece type positioned on the board. This is achieved by each piece or type of piece having an electrical resonant circuit tuned to one of a plurality of frequencies, to enable that piece or piece type to be distinguished. The apparatus is provided with means to determine the frequency of the resonant signal and hence the identity of the piece. This is preferably achieved by comparing the frequency of the resonant signal with information stored within the apparatus.

The transmit and receive coils are preferably connected in groups and arranged so that a group of transmit coils intersect with a group of receive coils at only one playing position. Individual transmit and receive coils may be provided for each of the playing positions, but this would mean that the coil selecting means would be unnecessarily complicated. Preferably multiplexers or similar switching devices are provided to select the transmit and the receive coil or coil groups.

When a transmit and a receive coil are selected and so connected to the amplifying circuit the noise of the apparatus initially induces the tuned circuit of a playing piece into resonance. This resonant signal is picked up by the receive coil beneath the playing position, amplified by the amplifying circuit and fed back to the transmit coil. This signal then couples with the tuned circuit, to induce a stronger resonant signal with a higher amplitude which is picked up by the receive coil. The gain and phase characteristics of the feedback loop should be such as to encourage oscillation, as is known in the art. This means that the playing piece is stimulated into resonance by an a.c. current, the frequency of which is accurately matched to the resonant frequency of the playing piece. This results in lower power consumption and an increased sensing range, together with a lower emission of electromagnetic radiation from the board. The ratio of flux in the resonator core to the current in the transmit coil is greatly improved and only a relatively small a.c. current is used. Additionally, the transmit and receive coils require fewer turns, suitably only one, and the resonator coil in the playing pieces may be reduced in size. Also, the array of receive and transmit coils is simplified since no diodes are required. Since the coils require a few turns of wire only, the coils are relatively flat and are therefore easily accommodated under the surface of the board.

The resonant signal detection means suitably comprises a circuit which outputs a signal once the amplitude of the resonant oscillation exceeds a threshold value.

The board may be made in a number of ways. For example, a sheet of plastic, or other suitable material, may be mounted on a pin jig and the first set of coils (e.g., the transmit coils) wound around the pins. A relatively thick piece of material may then be placed over the coils, to reduce the mutual inductance between the transmit and receive coils. The receive coils are then wound around the pins and subsequently covered with another plastic sheet. The board is then removed from the jig. In another embodiment, the features around which the coils are wound may be incorporated in the plastic moulding of the board. Preferably the overlap area of the transmit and receive coils beneath a square is substantially equal to the area of each discrete board position. This allows greater tolerance of the lateral position of playing pieces on a board position. Adjacent board positions are suitably wound in opposite directions to reduce the fields radiated from the board and also reduces the system's susceptibility to external electromagnetic interference.

The gain of the amplifier should be sufficiently high so that the time taken to obtain a resonant signal is relatively short.

It is desirable that oscillation should not occur when a playing piece is not present on a particular board position. There will, however, be some residual coupling between the transmit and receive coils, primarily from their mutual inductance, but also the capacitance between the wires can have an effect. If the amplifier gain is sufficiently high (necessary to achieve a large sensing range) then this coupling could result in spurious oscillation. This can be avoided by balancing this mutual inductance by a compensating network, preferably a transformer, arranged to null the effect at all operating frequencies. The inclusion of this compensating means increases the sensing range of the apparatus. This is because the residual coupling, which otherwise would have swamped the small coupling via a distant resonator, is mostly nulled.

The mutual inductance between transmit and receive windings is a function of both the area of overlap and also of the separation between the wires. The compensating network may have the ability to allow for different coupling factors between different coil pairs. Preferably however the board is manufactured to a high degree of precision, so that the coupling is substantially the same for all pairs. In this case a single transformer, preferably aircored, with one winding in series with the drive signal and one winding in series with the sense signal may be provided.

Alternatively, the system may be allowed to oscillate in the absence of a piece. The presence of a piece can then be determined in a number of ways. For example, the system may be arranged to oscillate at a frequency that can be easily distinguished from that of any of the pieces. Alternatively, once oscillating, the drive current may be cut and a short time later the received signal examined. In the absence of a piece the signal will die away quickly and no frequency will be seen. If, however, the oscillation is due to a piece then its Q-factor will maintain some signal amplitude even a short time after the drive is cut. The frequency of this signal can then be determined and the piece identified.

Means may be provided to limit the amplitude of the resonant signal. Conveniently, this limiting means comprises Automatic Gain Control (AGC) circuitry which ensures that the system operates in its linear region at all times. Such circuitry limits the gain of the system to such a level that the system oscillates at the frequency with the highest loop gain, i.e., the resonant frequency of the resonator.

In a discriminatory system, once resonance has been detected, the resonant signal is fed to logic circuitry, which may be similar to that described in British Patent No. 2 103 943, in order for the frequency of the resonant signal to be determined. The logic circuitry suitably comprises counters for counting the number of clock periods within a pre-defined number of oscillations of the resonant signal. Since the clock period is constant and known, the frequency of the resonant signal can be determined; the higher the frequency the shorter the count. Alternatively the number of oscillations of the resonant frequency in a pre-defined time may be measured directly. The time is defined by a counter clocked from a fixed frequency source. This resonant frequency can then be compared with a pre-set memory which contains the frequency of each playing piece or category of playing piece. Other known circuits or methods may be used to determine the frequency of the resonant signal.

Preferably each playing piece has a unique resonant signal. However, it may be necessary to provide each type of playing piece with a unique resonant signal, such that fewer distinct frequencies are employed. In a game of chess for example, it may only be necessary to identify the rank of each piece, in which case twelve frequencies would be necessary, in order to identify a queen, king, bishop, knight, castle and pawn of each colour. Additional pieces and hence resonant frequencies may be required to replace, and hence change the identity of, certain playing pieces on the board. In the game of chess, for example, if a pawn reaches the far side of the board, it is promoted to any chosen rank, excluding king. Alternatively, in a game such as "Shogi" (Japanese chess) which requires pieces to assume an opponent's identity, it is necessary to provide some means by which the pieces may have more than one resonant frequency. This may be achieved in a number of ways which include: providing two resonant circuits within a playing piece such that when the piece is inverted, the other resonant circuit comes into operation, the cores being designed to shield one resonant circuit from another; providing a switch on the piece, such that when the switch is tripped, the capacitive value, for example, of the piece is altered in a pre-defined manner, the apparatus being programmed to recognise this new resonant frequency; changing the shape of the core or the position of the coil on the core such that the resonant frequency alters in a pre-defined manner.

The invention will now be described by way of example only and with reference to the accompanying drawings wherein:

FIG. 5 is a block diagram showing one embodiment of the operation of the electronic board game.

Figure 1:
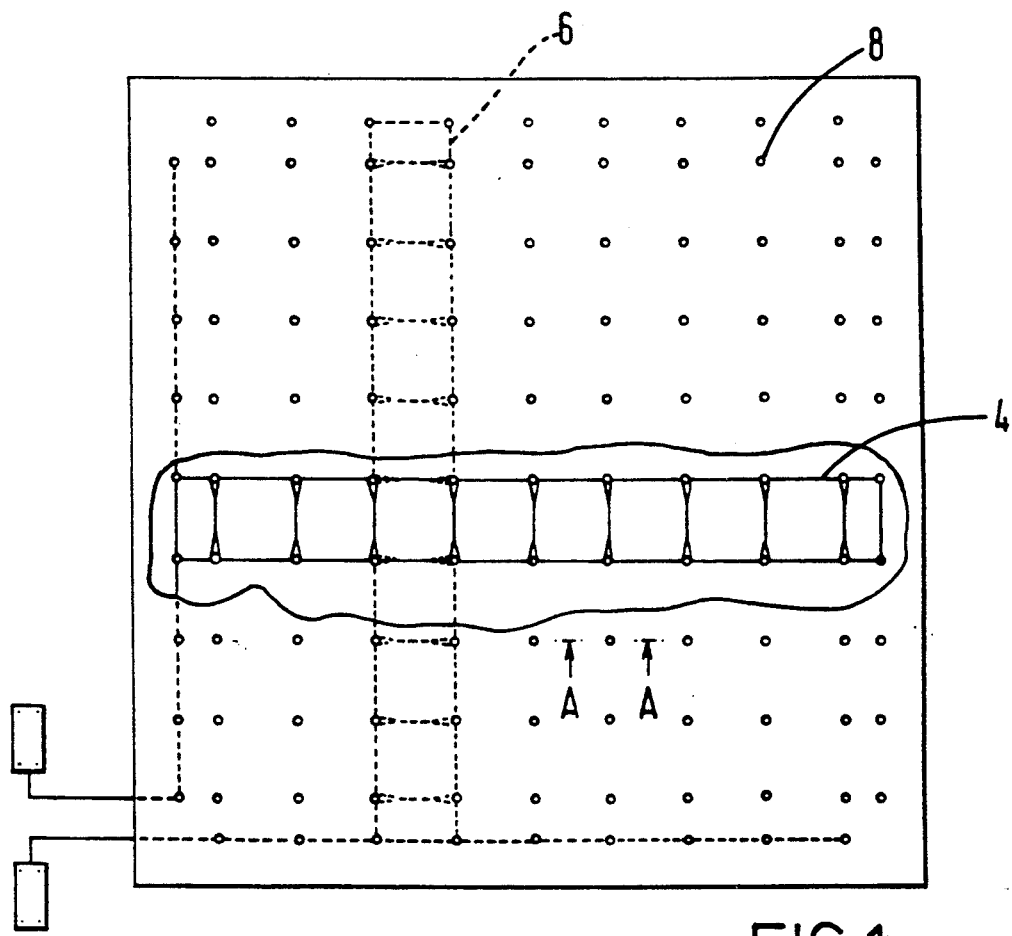
FIG. 1 shows the winding pattern of the board game apparatus according to the invention.

The board 2 shown in FIG. 1 has an array of windings 4 and 6 for transmitting and receiving respectively. Only one transmit coil 4 and one receive coil 6 are shown in FIG. 1. However, the other coils are wound in a similar manner. Each transmit coil and each receive coil covers a row or column respectively of, in this case, eight squares, such a board being suitable for use as a chess board. A transmit coil 4 intersects with a receive coil 6 at a unique playing position on the board. The wire is routed around the periphery of each square by means of winding features 8, with adjacent squares being wound in opposite direction. A unique playing square is selected by means of selecting one transmit coil 4 (and hence a row of the chess board) and one receive coil 6 (and hence a column). Multiplexers (see FIG. 5) are used to select the transmit and receive coils.

Figure 2:
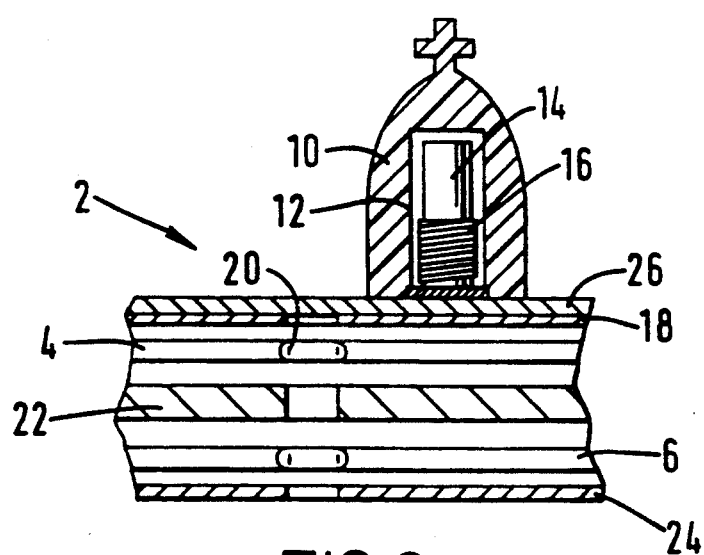
FIG. 2 is a section through the board of FIG. 1 along the line A—A, with a playing piece in position.

As shown in FIG. 2, the board 2 comprises a top layer 18 which, during manufacture, is placed on a pin jig. The first set of coils, for example the transmit coils 4, are then wound around the pins inserted in holes 20. A separator sheet 22 is then placed over the winding in order to reduce the mutual inductance between the two sets of coils. The second set of coils 6 is then wound around the pins and finally a bottom layer 24 is placed over the coil 6. The board is then removed from the jig and a cosmetic top cover 26 placed over layer 18.

FIG. 2 also shows a playing piece 10 positioned on the board. Each piece 10 has a hollow interior 12 within which is mounted a ferrite core 14. Around the lower end of this core is provided a coil 16 made up of a number of turns of thin wire, &or example enamelled copper wire. A capacitor (not shown) is mounted in parallel with the coil 16 to form a circuit having a natural resonant frequency. Each playing piece 10 or each rank of playing piece has a unique resonant circuit and hence resonant frequency, by which it may be identified. A variety of combinations of coils and capacitors are needed to provide the different resonant frequencies. In general, lower resonant frequencies require larger diameter cores for the coils if the desired sensing range is to be achieved. If the number of different frequencies is limited then it should be possible to hold the tolerances of the core, winding and capacitor so that no adjustment is necessary. Otherwise, adjustment can be made by altering either the value of the capacitor (either using a variable type or by selecting the required value), the number of turns in the coil or by moving the coil on the rod core.

By way of example, in a game of chess there are twelve ranks of chessmen to be identified; namely, a king, a queen, a bishop, a knight, a castle and a pawn of each colour. These may be readily distinguished by spreading the resonant frequency of each piece, over a range of say 50 kHz to 500 kHz. These resonant frequencies should be geometrically spaced apart. This range is high enough to make the resonators relatively compact yet does not cause excessive electromagnetic interference. Promotion pieces may also be supplied.

Figure 3:
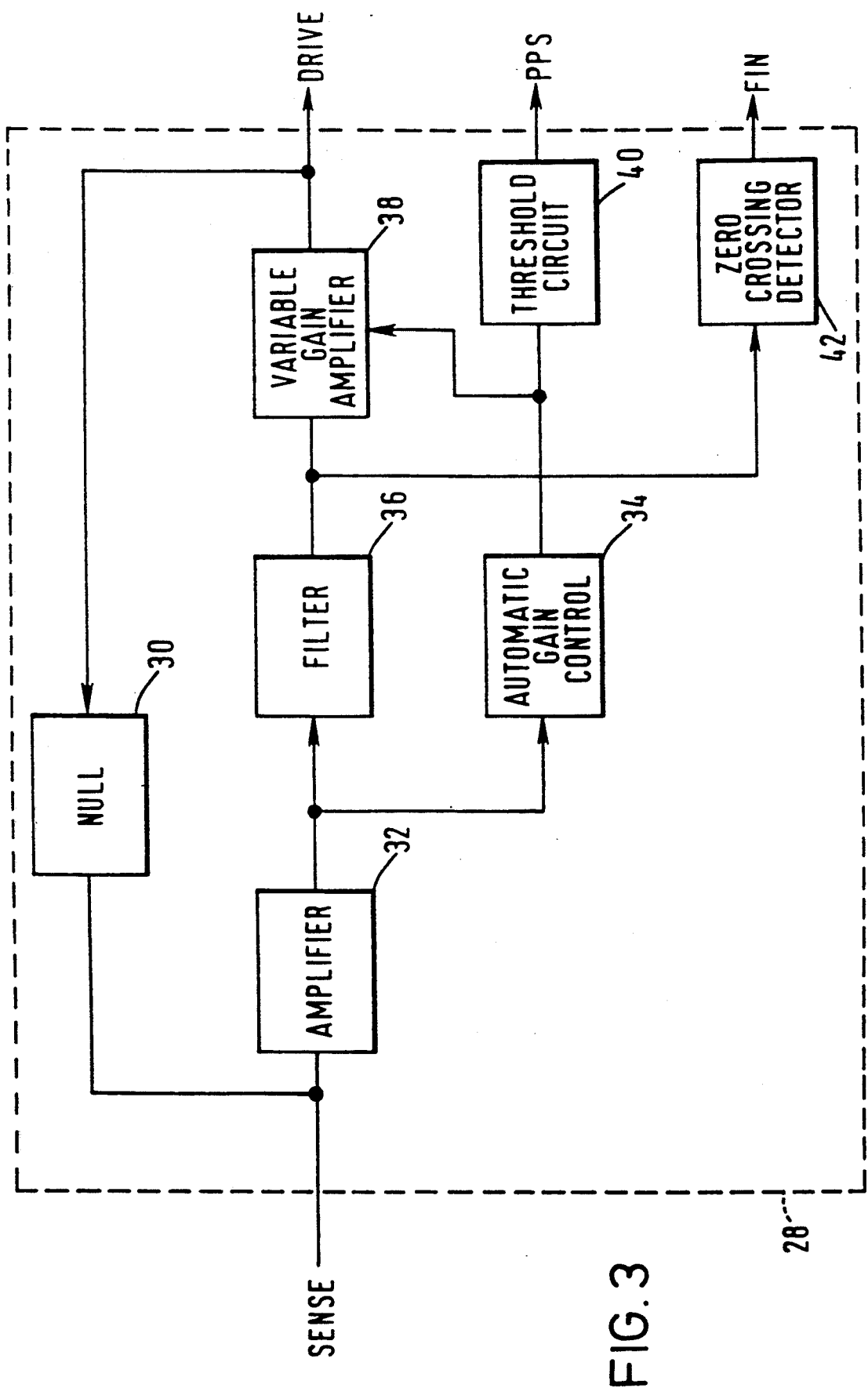
FIG. 3 is a block diagram of the electronic components of the board game apparatus necessary for amplifying the resonant signal according to the invention.

The amplifying circuit 28 of FIG. 3 has a null circuit 30 to balance the residual coupling between the receive and transmit coils. A high gain amplifier 32 with low noise and phase shift, is then provided to amplify the receive signal. The signal derived from the amplifier 32 is used to drive the Automatic Gain Control (AGC) circuit 34 and also passes through a filter 36 and is fed to a variable gain amplifier 38. The amplified signal is then either diverted to the drive coils or 0V, depending on the gain required by the AGC circuit. A signal is derived from the AGC and is fed to a circuit 40 which determines whether an oscillation of adequate amplitude is present. A zero-crossing detector 42 produces a signal from which the frequency of the oscillation is determined. Both of these signals PPS and FIN respectively are fed to logic circuits (as shown in FIG. 5) which determine the frequency of FIN and, by comparison with the stored frequency of each playing piece, determine the identity of the piece present on the particular playing square.

Figure 4:
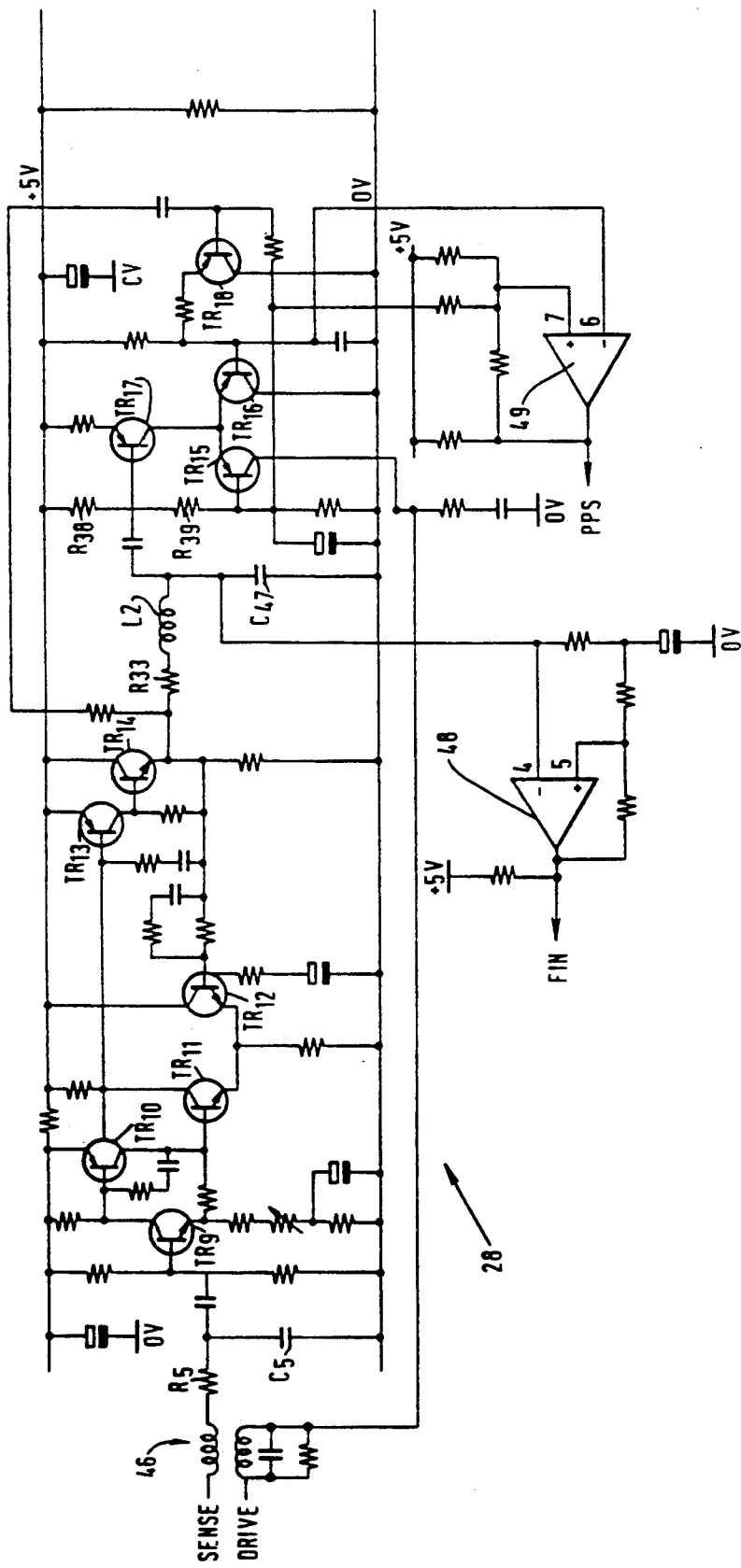
FIG. 4 is an electronic circuit suitable for amplifying the resonant signal.

FIG. 4 shows one embodiment of the electronics necessary to generate the resonant signal. The null circuit is provided by a transformer 46, preferably a small, air-cored transformer, with one winding in series with the drive signal and the other in series with the sense signal. An RC low-pass filter, consisting of $R_{15}$ and $C_5$ is provided to remove high frequency noise from the remaining sense signal. The signal then passes to an input amplifier which comprises $TR_9$ and $TR_{10}$. This amplifier has a typical voltage gain of around 50 and very low noise and phase shift in the frequency band 50–500 KHz. The signal then passes to a high gain intermediate amplifier, which consists of $TR_{11, 12, 13, 14}$. This amplifier has a gain of around 300 and very low phase shift and provides a low output impedance to drive the output and AGC circuits. Part of the signal is fed through a filter which comprises $R_{33}$, $L_2$, $C_{47}$ and the input resistance of the bias resistor chain $R_{38}$, $R_{39}$. This filter provides high frequency rejection to remove any excess high frequency noise and improves the circuit stability against spurious oscillations in the absence of a resonator on the square being tested. The signal from the filter is then amplified by PNP transistor $TR_{17}$. This signal, together with a d.c. bias is diverted either to the transmit coils (signal DRIVE) or to 0V according to the differential voltage across the bases of the emitter-coupled pair, $TR_{15}$, $TR_{16}$. The differential voltage is controlled by $TR_{18}$ which forms the Automatic Gain Control (AGC) circuit 34. As the amplitude of the resonant signal increases the output of $TR_{18}$ increases and so turns on $TR_{16}$, so that the signal from $TR_{17}$ is diverted to 0V. The amplitude of oscillation is therefore kept at a controlled level. In the absence of resonance, the amplifier gain is well defined since all of the current goes into the transmit coils via transistor $TR_{15}$.

Voltage comparator 48 acts as a zero crossing detector and outputs a square wave FIN, the frequency of which is equal to the frequency of the resonant signal. The output of the AGC circuit $TR_{18}$ is fed to a second voltage comparator 49 which produces a signal PPS, once a threshold voltage has been exceeded and so stable oscillation has been achieved and hence indicates whether or not a playing piece is present on the board position in question before the resonant frequency is determined.

These two signals FIN and PPS are processed in a conventional manner to determine the frequency of the resonant signal. A block diagram of such processing circuitry is shown in FIG. 5.

The signal FIN passes to a counter 50 and the signal PPS is fed to a microprocessor 52. Once the amplitude of the resonant signal reaches a threshold value, the signal PPS causes a signal to pass from the microprocessor 52 to the counter 54, the output of which gates counter 50 into operation. Counter 54 counts a predefined number of oscillations of a fixed frequency source and hence determines the fixed time period in which counter 50 counts the number of oscillation of the signal FIN. The output of counter 54 at the end of this fixed time period stops the operation of counter 50.

The count resulting from counter 50 is directly proportional to the resonant frequency of the particular playing piece 10. The count is compared with information stored in the memory 58 to determine which playing piece is present.

Typical response speeds for apparatus of this type allow in excess of 100 positions per second to be tested.

Although examples of this invention refer to the game of chess, it is recognised that electronic game apparatus of this kind may be used in other applications. This includes games which require one or more players and one or more game boards, in which all the boards do not reveal the full status of a game; i.e., do not show the presence of all operative pieces to all the players. This apparatus may also be used in a board which controls the game. For example a board having an on/off feature, degrees of difficulty etc. It will also be appreciated that games according to the invention can utilize pieces without resonant circuits, for example when the electronic detection of their presence is not essential.

I claim:

1. An electronic game apparatus comprising:
   a plurality of playing pieces each including an electrical resonant circuit;
   means forming at least one surface and having a plurality of transmit and receive coils beneath the surface defining a number of discrete playing positions for the playing pieces on the surface;
   means for selecting a transmit and a receive coil and hence a unique playing position, an amplifying circuit being connected between the transmit and receive coils whereby a resonant signal is generated when a playing piece is positioned on a selected playing position; and
   means for detecting the generated resonant signal.

2. Apparatus as claimed in claim 1 including means for determining the frequency of the detected resonant signal and for identifying the playing piece on the corresponding playing position.

3. An apparatus as claimed in claim 2 wherein the means for determining the resonant frequency comprises a counter for counting the number of resonant oscillations within a fixed time period, a memory storing an oscillation frequency for each piece, and means for comparing the count from the counter with the stored oscillation frequencies.

4. An apparatus as claimed in claim 1 including means for compensating for a residual coupling between the transmit and receive coils.

5. An apparatus as claimed in claim 4 wherein the compensating means comprises a single transformer having a first winding in series with the transmit coils and a second winding in series with the receive coils.

6. An apparatus as claimed in claim 1 further including means for generating a drive current in said transmit coils, wherein said detection means comprises means for cutting said current in said transmit coils and means for subsequently detecting a resonant signal in said receive coils.

7. An apparatus as claimed in claim 1 including means for controlling the amplitude of the resonant signal.

8. An apparatus as claimed in claim 7 wherein the controlling means comprises an Automatic Gain Control circuit.

9. An apparatus as claimed in claim 1 wherein the playing pieces comprise a hollow interior, a ferrite core mounted within said playing piece interior, a coil disposed about an end of the core proximate said surface, and an adjustable capacitor connected to said playing piece coil.

10. An apparatus as claimed in claim 1 wherein said means for selecting includes a multiplexer.

* * * * *